United States Patent

[11] 3,607,957

| [72] | Inventors | Albert Antonini<br>Paris;<br>Claude Kaziz, La Courneuve; Georges<br>Wetroff, Le Thillay, all of France |
|---|---|---|
| [21] | Appl. No. | 730,664 |
| [22] | Filed | May 20, 1968 |
| [45] | Patented | Sept. 21, 1971 |
| [73] | Assignee | Produits Chimiques Pechiney-Saint-Gobain<br>Paris, France |
| [32] | Priority | May 19, 1967 |
| [33] | | France |
| [31] | | 106978 |

[54] TRICHLOROETHYLENE AND DICHLOROETHYLENES PREPARED BY OXYCHLORINATION
15 Claims, No Drawings

[52] U.S. Cl. ................................................ 260/654 A, 260/658 R

[51] Int. Cl. ................................................ C07c 17/06, C07c 21/10
[50] Field of Search ........................................ 260/654 A, 658 R

[56] References Cited
UNITED STATES PATENTS

| 2,374,923 | 5/1945 | Cass .............................. | 260/654 A |
| 3,444,252 | 5/1969 | Brown et al. .................. | 260/654 A |
| 3,345,422 | 10/1967 | Piester et al. ................. | 260/654 A |
| 3,454,661 | 7/1969 | Hornig et al. ................. | 260/654 A |

*Primary Examiner*—Leon Zitver
*Assistant Examiner*—Joseph A. Boska
*Attorney*—McDougall, Hersh, Scott & Ladd ABSTRACT: Process for preparation of trichloroethylene and dichloroethylenes by oxychlorination with a fluid bed catalyst of $C_2$ chlorinated ethylenic derivatives such as vinylidene chloride, dichloroethylenes and possibly vinyl chloride.

TRICHLOROETHYLENE AND DICHLOROETHYLENES PREPARED BY OXYCHLORINATION

This invention relates to a process for the oxychlorination of a mixture of $C_2$ ethylenic mono- and dichlorinated derivatives to produce a reaction product formed principally of $C_2$ ethylenic dichlorinated and trichlorinated derivatives.

In accordance with the oxychlorination process of this invention, gaseous hydrochloric acid, a molecular oxygen containing gas, and a gaseous mixture formed of $C_2$ ethylenic mono- and dichlorinated derivatives are passed at a temperature within the range of 150° to 350° C., and preferably 260° to 320° C., through a catalytic reaction zone with the catalyst in a fluidized state.

The gaseous reaction mixture of mono- and dichlorinated ethylenic derivatives contains from 0 to 50 molar percent vinyl chloride and preferably less than 20 molar percent vinyl chloride while the molar ratio of $CH_2 = CCl_{CCl2}/CHCl = CHCl$ is within the range of 0.4 to 2.3, and preferably 0.65 to 1.1.

Under these conditions, the dichloroethylenes present in the feed mixture are practically untransformed with the result that the amount of dichloroethylenes issuing from the reaction zone is almost the same as the amount of dichloroethylenes introduced into said zone. Consequently, the dichloroethylenes may be considered as functioning in the role of diluent for the remainder of the reaction components.

For this purpose, the amount of reactants HCl and oxygen in the gaseous feed mixture is regulated with regard to the amount of vinyl chloride and vinylidene chloride in the feed. The desired results are achieved with the feed molar ratio of reactants $HCl/(C_2H_3Cl + CH_2 = CCl_2)$ within the range of 0.5 to 2.0 and preferably 0.7 to 1.6, and $O_2/(C_2H_3Cl + CH_2 = CCl_2)$ within the range of 0.20 to 0.80 and preferably 0.40 to 0.65. Generally, the feed flow rate of the mixture, calculated on the basis of the $C_2$ ethylenic mono- and dichlorinated derivatives, is within the range of 1 to 20 moles per hour per liter of catalyst and preferably 2 to 10 moles per hour per liter of catalyst.

In a preferred embodiment of this invention, use is made of practically pure oxygen or oxygen as pure as the reactant comprising the molecular oxygen. In such event, the reaction products, which are readily condensable upon cooling, formed principally of trichloroethylene, 1,1,2-trichloroethane, 1,1,1,2-tetrachloroethane and 1,1,2,2,-tetrachloroethane, are separated partially or entirely from the effluent of the catalytic reaction zone by condensation upon cooling. The uncondensed gases, which contain a mixture of untransformed vinyl chloride, vinylidene chloride and dichloroethylenes, are recovered by means well known and the vinyl chloride and vinylidene chloride accompanied by dichloroethylenes are recycled to the reaction zone after first separating out the major portion of the dichloroethylenes as well as other compounds more highly chlorinated than dichloroethylenes.

The easily condensable products and the products recovered from the uncondensed gases are treated by well-known means to separate $C_2$ ethylenic chlorinated and trichlorinated derivatives.

In accordance with one alternate procedure, 1,1,2-trichloroethane, 1,1,1,2-tetrachloroethane and/or 1,1,2,2,-tetrachloroethane are added for introduction with the feed of the reactants to the catalytic reaction zone, addition being made in a molecular proportion with respect to the amount of the feed reactants vinyl chloride + vinylidene chloride, of less than 2.

In another advantageous embodiment of this invention, the oxychlorination reaction is carried out at a pressure within the range of 1 to 10 absolute bars and preferably 1 to 8 absolute bars.

This invention also has for an object a new and improved catalytic system adapted for use in the oxychlorination of the mixture of $C_2$ ethylenic mono- and dichlorinated derivatives.

The catalyst used for carrying out the process is formed essentially of a catalytic agent deposited on a carrier having an average specific surface area greater than 1 m.²/g. and preferably greater than 10m.²/g.

In the specification, the term "average specific surface area" is used to mean that, if a series of catalyst samples are taken from different points of the catalytic bed in order to determine the specific surface area of the carrier according to the B.E.T. method, the results will show a dispersion in which the extreme values do not deviate more than about 25 percent from the average.

As the carrier for the catalytic agent, use can be made of one or more substances such as alumina, magnesia, graphite, activated carbon, alumino-silicates, and preferably clays and silica having the aforementioned characteristics. The average particle size of the carrier should be within the range of 20 to 400 microns and preferably 40 to 120 microns. Good results are obtained with an attapulgite type of clay which, when used in the oxychlorination of this invention, should have an average specific surface area within the range of 10 to 160 m.²/g. Very good results are obtained with a carrier consisting essentially of silica and magnesia having an average specific surface area within the range of 40 to 200 m.²/g. and which has excellent fluidization characteristics.

The catalytic agents used in the process are essentially constituted of at least a compound of the following list of elements, namely: alkali metals, alkaline earth metals, bismuth, cadmium, chromium, cobalt, copper, tin, magnesium, manganese, nickel, platinum, rare earths, thorium, vanadium, zinc and zirconium.

The following examples are given by way of illustration, but not by way of limitation of this invention:

EXAMPLES I TO V

Mixtures of vinylidene chloride and dichloroethylenes containing vinyl chloride in Examples IV and V or without vinyl chloride in Examples I to III are subjected to oxychlorination in the proportions set forth in the following table.

The oxychlorination is carried out in a glass reactor having an internal diameter of 65 mm. and a height of 1,000 mm. with means for heating in the form of external electrical resistance heaters. The lower portion of the tube is equipped with a reversed cone filled with 2 mm. glass beads for mixing the reactants and to diffuse the gases in the catalytic bed. The height of the catalytic bed, at rest after fluidization, is 450 mm. The catalyst is prepared by impregnating an attapulgite clay with an aqueous solution of $CuCl_2·2H_2O$ and KCl to provide a final content of dry catalyst in copper and potassium cations of 8.7 percent and 4.9 percent by weight respectively. The average specific surface area of the carrier, when measured after the catalyst has been operated under normal operating conditions for about 100 hours of reaction, is about 80 m.²/g. The catalytic mass presents a granular size ranging from 100 to 315 microns, of which 50 percent has a granular size less than 210 microns.

During the operation, the reactants of gaseous hydrochloric acid, practically pure oxygen, vinylidene chloride, dichloroethylenes and vinyl chloride, when used, are fed under an absolute pressure of 1.1 bar to the lower part of the reversed cone and the reactor is heated by the external electrical resistance heaters regulated by means of thermocouples placed between an external wall of the tube and the heaters. The catalytic bed is operated at a uniform and constant temperature of 300° C. ± 2° C. for Examples I and II, 310° C. ± 2° C. for Example III, and 325° C. for Examples IV and V.

The effluent from the catalytic reaction zone is cooled to 0° C. to condense the condensable products and the gaseous remainder is washed by countercurrent flow in a column with an organic solvent such as orthodichlorobenzene, to recover therein the volatile products.

Vinylidene chloride and vinyl chloride, when present, accompanied by dichloroethylenes, are recovered in the condensed products and in the washing solution from which they are separated in order to recycle the recovered materials to the feed of the catalytic reaction zone.

The results vary according to the composition of the mixture entering the reaction zone and according to the operating conditions.

The table hereinafter set forth gives the results obtained:

TABLE

| Example | I | II | III | IV | V |
|---|---|---|---|---|---|
| Flow rate of the feed mixture in moles/h. and per liter of catalyst | 4.07 | 3.84 | 4.51 | 3.66 | 3.47 |
| Composition of the feed mixture for 1,000 moles of mixture: | | | | | |
| $CH_2=CCl_2$ | 502 | 491 | 382 | 460 | 402 |
| $CHCl=CHCl$ | 498 | 509 | 618 | 470 | 418 |
| $CH_2=CHCl$ | | | | 70 | 180 |
| Feed molar ratios of the reactants: | | | | | |
| $HCl/(CH_2=CCl_2+C_2H_3Cl)$ | 0.89 | 1.03 | 0.97 | 1.11 | 1.54 |
| $O_2/(CH_2=CCl_2+C_2H_3Cl)$ | 0.425 | 0.46 | 0.485 | 0.53 | 0.61 |
| Composition of the effluent for 1,000 moles of mixture of vinylidene chloride, dichloroethylenes and vinyl chloride involved: | | | | | |
| $C_2H_3Cl$ | | | | 12 | 9 |
| $CH_2=CCl_2$ | 162 | 129 | 138 | 69 | 35 |
| $CHCl=CHCl$ | 465 | 463 | 533 | 434 | 366 |
| $CHCl_2-CH_2Cl$ | | | | 50 | 160 |
| $C_2HCl_3$ | 278 | 294 | 260 | 382 | 337 |
| $CHCl_2-CHCl_2$ | 33 | 44 | 29 | 22 | 24 |
| $CCl_3-CH_2Cl$ | 45 | 52 | 17 | 2 | 4 |
| $CCl_2=CCl_2$ | 2 | 2 | 1 | 4 | 11 |
| $C_2HCl_5$ | 2 | 3 | 1 | 6 | 32 |
| $CO$ | 3 | 3 | 5 | 3 | 3 |
| $CO_2$ | 10 | 8 | 10 | 11 | 13 |
| Divers | | 2 | 6 | 5 | 6 |
| $HCl$ | 4 | 7 | 13 | 25 | 54 |
| $O_2$ | 8 | 6 | 5 | 12 | 13 |
| Transformation rate of the reactants expressed in molar percent: | | | | | |
| $C_2H_3Cl$ | | | | 82.9 | 95.0 |
| $CH_2=CCl_2$ | 67.7 | 73.8 | 63.9 | 85.0 | 91.6 |
| $CHCl=CHCl$ | 6.6 | 8.6 | -2.9 | 7.7 | 12.5 |
| $HCl$ | 99.1 | 98.6 | 96.5 | 95.7 | 93.9 |
| $O_2$ | 96.2 | 97.3 | 97.3 | 95.7 | 96.3 |

It will be observed that the amounts of dichloroethylenes issuing from the catalytic reaction zone are only 6 percent to 13 percent below the amount of dichloroethylenes introduced into the catalytic reaction zone. The ratio of trichloroethylene formed with respect to the amount of reactants (vinyl chloride + vinylidene chloride + dichloroethylenes) transformed is respectively 74.5 percent, 72.7 percent, 79.0 percent, 78.7 percent and 57.1 percent for Examples I to V.

The total conversion rates of hydrochloric acid and oxygen are very high. The amount of uncondensable effluent is low thereby to promote the recovery of the volatile chlorinated products.

It will be apparent from the foregoing that we have provided an improved oxychlorination process for the production of trichloroethylene and dichloroethylenes from a mixture of $C_2$ ethylenic mono- and dichlorinated derivatives.

It will be understood that changes may be made in the details of formulation and operation without departing from the spirit of the invention, especially as defined in the following claims.

1. A process for the preparation of trichloroethylene and dichloroethylenes comprising passing a gaseous mixture of hydrogen chloride, a molecular oxygen-containing gas and an organic feed mixture selected from the group consisting of (1) a mixture of 1,1-dichloroethylene and 1,2-dichloroethylene in a mole ratio within the range of 0.4 to 2.3, (2) a mixture of 1,1,-dichloroethylene and 1,2-dichloroethylene in a ratio within the range of 0.4 to 2.3 containing up to 50 mole percent vinyl chloride based on the feed mixture, and (3) a mixture of 1,1-dichloroethylene and 1,2-dichloroethylene in a mole ratio within the range of 0.4 to 2.3 containing 0 to 50 mole percent vinyl chloride based on the feed mixture and at least one chlorinated $C_2$ saturated compound selected from the group consisting of 1,1,2-trichloroethane, 1,1,1,2-tetrachlorethane and 1,1,2,2-tetrachloroethane, said compound being present in a molecular proportion of less than 2 based on the amount of 1,1,-dichloroethylene and vinyl chloride in the feed mixture wherein the HCl used in the reaction is regulated to provide a ratio of $HCl/(CH_2=CHCl+CH_2=CCl_2)$ within the range of 0.5 to 2.0 through a fluidized bed of an oxychlorination catalyst on a carrier having a surface area within the range of 10–200 m.²/g. at a temperature within the range of 150° to 350° C.

2. The process as claimed in claim 1 in which the reaction is carried out at a temperature within the range of 260° to 320° C.

3. The process as claimed in claim 1 in which the organic feed contains vinyl chloride in an amount less than 20 mole percent of the $C_2$ chlorinated ethylenic derivatives in the feed.

4. The process as claimed in claim 1 in which the molar feed ratio of vinylidene chloride to dichloroethylenes in the feed is within the range of 0.65 to 1.1.

5. The process as claimed in claim 1 in which the molar feed ratio of $HCl/(C_2H_3Cl+CH_2=CCl_2)$ is within the range of 0.7 to 1.6.

6. The process as claimed in claim 1 in which the molar feed ratio of $O_2/(C_2H_3Cl+CH_2=CCl_2)$ is within the range of 0.20 to 0.80.

7. The process as claimed in claim 1 in which the molar feed ratio of $O_2/(C_2H_3Cl+CH_2=CCl_2)$ is within the range of 0.40 to 0.65.

8. The process as claimed in claim 1 in which the feed flow rate, when based upon the $C_2$ chlorinated ethylenic derivatives in the feed, is within the range of 1 to 20 moles per hour per liter of catalyst.

9. The process as claimed in claim 1 in which the feed flow rate, when based upon the $C_2$ chlorinated ethylenic derivatives in the feed, is within the range of 2 to 10 moles.

10. The process as claimed in claim 1 in which the feed flow rate into the catalytic reaction zone, when based upon the $C_2$ chlorinated ethylenic derivatives in the feed is within the range of 1 to 20 moles per hour per liter of catalyst and in which the molar feed ratio of vinylidene chloride to dichloroethylenes in the feed is within the range of 0.4 to 2.3, $HCl/(C_2HCl+CH_2-CCl_2)$ is within the range of 0.5 to 2.0 and $O_2/(C_2H_3Cl+CH_2=CCl_2)$ is within the range of 0.2 to 0.8.

11. The process as claimed in claim 1 in which the feed flow rate into the catalytic reaction zone, when based upon the $C_2$ chlorinated ethylenic derivatives in the feed is within the range of 2 to 10 moles per hour per liter of catalyst and in which the molar feed ratio of vinylidene chloride to dichloroethylenes in the feed is within the range of 0.65 to 1.1, $HCl/(C_2H Cl+CH_2=CCl_2)$ is within the range of 0.7 to 1.6, and $O_2/(C_2H_3 Cl+CH_2=CCl_2)$ is within the range of 0.40 to 0.65.

12. The process as claimed in claim 1 in which the molecular oxygen containing gas is practically pure oxygen.

13. The process as claimed in claim 1 in which the carrier has an average size within the range of 20 to 400 microns.

14. A process for the preparation of trichloroethylene and dichloroethylenes comprising passing a gaseous mixture of hydrogen chloride, a molecular oxygen-containing gas and an organic feed mixture selected from the group consisting of (1) a mixture of 1,1-dichloroethylene and 1,2-dichloroethylene in a mole ratio within the range of 0.4 to 2.3, (2) a mixture of 1,1-dichloroethylene and 1,2-dichloroethylene in a ratio within the range of 0.4 to 2.3 containing up to 50 mole percent vinyl chloride based on the feed mixture, and (3) a mixture of 1,1-dichloroethylene and 1,2-dichloroethylene in a mole ratio within the range of 0.4 to 2.3 containing 0 to 50 mole percent vinyl chloride based on the feed mixture and at least one chlorinated $C_2$ compound selected from the group consisting of 1,1,2-trichloroethane, 1,1,1,2-tetrachlorethane and 1,1,2,2-tetrachloroethane, said compound being present in a molecular proportion of less than 2 based on the amount of 1,1-dichloroethylene and vinyl chloride in the feed mixture wherein the HCl used in the reaction is regulated to provide a ratio of $HCl/(CH_2=CHCl+CH_2=CCl_2)$ within the range of 0.5 to 2.0 and the oxygen used is regulated to provide a ratio of $O_2/(CH_2=CHCl+CH_2=_{CHCl2})$ within the range of 0.20 to 0.80 through a fluidized bed of oxychlorination catalyst on a carrier having a surface area within the range of 10–200 m.²/g. at a temperature with the range of 150°–350° C.

15. A process for the preparation of trichloroethylene and dichloroethylenes comprising passing a gaseous mixture of hydrogen chloride, a molecular oxygen-containing gas and an organic feed mixture selected from the group consisting of (1)

a mixture of 1,1-dichloroethylene and 1,2-dichloroethylene in a mole ratio within the range of 0.4 to 2.3, (2) a mixture of 1,1-dichloroethylene and 1,2-dichloroethylene in a ratio within the range of 0.4 to 2.3 containing up to 50 mole percent vinyl chloride based on the feed mixture, and (3) a mixture of 11-dichloroethylene and 1,2-dichloroethylene in a mole ratio within the range of 0.4 to 2.3 containing 0 to 50 mole percent vinyl chloride based on the feed mixture and at least one chlorinated $C_2$ saturated compound selected from the group consisting of 1,1,2-trichloroethane, 1,1,1,2-tetrachloroethane and 1,1,2,2-tetrachloroethane, said compound being present in a molecular proportion of less than 2 based on the amount of 1,1-dichloroethylene and vinyl chloride in the feed mixture wherein the HCl is used in the reaction is regulated to provide a ratio of $HCl/(CH_2=CHCl+CH_2=CCl_2)$ within the range of 0.5 to 2.0 and the oxygen used is regulated to provide a ratio of $O_2/(CH_2=CHCl+CH_2=CCl_2)$ within the range of 0.20 to 0.80 through a fluidized bed of oxychlorination catalyst on a carrier selected from the group consisting of attapulgite clay having a specific surface area within the range of 10–160 m.$^2$/g. and a mixture of silica and magnesia having an average specific surface area within the range of 40–200 m.$^2$/g. at a temperature of 150°–35° C.

UNITED STATES PATENT OFFICE
CERTIFICATE OF CORRECTION

Patent No. 3,607,957          Dated September 21, 1971

Inventor(s) Albert Antonini, Claude Kaziz, Georges Wetroff

It is certified that error appears in the above-identified patent and that said Letters Patent are hereby corrected as shown below:

Column 1, line 18, $CH_2 = CCl_{CCl2}$ should be $CH_2 = CCl_2$

Column 2, line 65, after "325° C." insert $\pm$ 2° C.

Claims 10 and 11, line 7, $HCl/(C_2HCl + CH_2 - CCl_2)$ should be: $HCl/(C_2H_3Cl + CH_2 = CCl_2)$ Signed and sealed this 21st day of March 1972.

(SEAL)
Attest:

EDWARD M. FLETCHER, JR.
Attesting Officer

ROBERT GOTTSCHALK
Commissioner of Patents